US009465235B2

(12) United States Patent
Chang

(10) Patent No.: US 9,465,235 B2
(45) Date of Patent: Oct. 11, 2016

(54) THROUGH-THE-LENS (TTL) LOUPES WITH IMPROVED DECLINATION ANGLE

(71) Applicant: General Scientific Corporation, Ann Arbor, MI (US)

(72) Inventor: Byung J. Chang, Ann Arbor, MI (US)

(73) Assignee: General Scientific Corporation, Ann Arbor, MI (US)

(*) Notice: Subject to any disclaimer, the term of this patent is extended or adjusted under 35 U.S.C. 154(b) by 0 days.

(21) Appl. No.: 14/554,551

(22) Filed: Nov. 26, 2014

(65) Prior Publication Data

US 2015/0146290 A1    May 28, 2015

Related U.S. Application Data

(63) Continuation of application No. 29/480,902, filed on Jan. 30, 2014, now Pat. No. Des. 746,354.

(60) Provisional application No. 61/909,405, filed on Nov. 27, 2013.

(51) Int. Cl.
    *G02C 7/08*         (2006.01)
    *G02B 25/00*       (2006.01)

(52) U.S. Cl.
    CPC .............. *G02C 7/088* (2013.01); *G02B 25/00* (2013.01)

(58) Field of Classification Search
    CPC ............................. G02C 7/088; G02B 25/00
    USPC .................... 359/481, 480; 351/158
    See application file for complete search history.

(56) References Cited

U.S. PATENT DOCUMENTS

| 1,360,727 | A | * | 11/1920 | Cross ...................... G02C 7/06 351/159.43 |
| 1,396,303 | A | * | 11/1921 | Walsh ..................... G02C 7/06 351/159.48 |
| 3,273,456 | A | | 9/1966 | Feinbloom |
| 4,834,525 | A | | 5/1989 | Vansaghi |
| 5,384,607 | A | | 1/1995 | Morris et al. |
| 6,120,145 | A | | 9/2000 | Lyst, Jr. et al. |
| 6,513,929 | B2 | | 2/2003 | Chang |
| 6,667,832 | B2 | | 12/2003 | Caplan et al. |
| D592,691 | S | | 5/2009 | Chang |
| D592,692 | S | | 5/2009 | Chang |
| D592,693 | S | | 5/2009 | Chang |
| 7,542,204 | B2 | | 6/2009 | Fante et al. |
| D617,825 | S | | 6/2010 | Chang |

(Continued)

FOREIGN PATENT DOCUMENTS

EP         1073924       3/2008

*Primary Examiner* — Thomas K Pham
*Assistant Examiner* — Mitchell Oestreich
(74) *Attorney, Agent, or Firm* — Dinsmore & Shohl LLP

(57) ABSTRACT

Dental/medical/surgical loupes have an improved declination angle to reduce neck and back strain. Eyeglass frames are provided with carrier lenses having bottom edges. A hole is provided in each carrier lens, each hole having an outer periphery that extends below the bottom edge of the carrier lens, resulting in a pair of opposing pointed ends. A pair of ocular devices are cemented in a respective one of the holes, such that a portion of the ocular body also extends below the bottom edge of the carrier lens. Each ocular is then cemented or otherwise permanently affixed into position to achieve a desired declination angle. For added stability, a pair of holes may be formed into the body of each ocular, each pair of holes being physically aligned with the two opposing pointed ends of the carrier lens associated with that ocular.

3 Claims, 4 Drawing Sheets

(56) References Cited

U.S. PATENT DOCUMENTS

| | | |
|---|---|---|
| 7,891,808 B2 | 2/2011 | Mazurenko |
| 2010/0290115 A1* | 11/2010 | Chang .................... G02C 7/088 359/481 |
| 2012/0250145 A1 | 10/2012 | Feinbloom et al. |
| 2012/0250414 A1 | 10/2012 | Khandelwal et al. |

* cited by examiner

THROUGH-THE-LENS (TTL) LOUPES WITH IMPROVED DECLINATION ANGLE

REFERENCE TO RELATED APPLICATIONS

This application claims priority from U.S. Provisional Patent Application Ser. No. 61/909,405, filed Nov. 27, 2013, and is also a continuation-in-part of U.S. Design patent application Ser. No. 29/480,902, filed Jan. 30, 2014. The entire content of both of which are incorporated herein by reference.

FIELD OF THE INVENTION

This application relates generally to telemicroscopic loupes of the type worn by surgical, medical and dental practitioners and, in particular, to so-called through-the-lens (TTL) loupes and, more particularly, to methods and apparatus for improving the declination angle of TTL loupes.

BACKGROUND OF THE INVENTION

There are different types of loupes for surgical, medical and dental applications, including frame-mounted and flip-up styles and through-the-lens (TTL) loupes. Making reference to FIG. 1, the declination angle of loupes may be defined as the angle 114 between a reference line 104 connecting the top of the ears 117 (where the frame arm rests) to the corner of the eyes, and the optical axis 106 of the loupe oculars. The frame temple arm 120 may be used as the reference line if the temple arms are mounted at the same level with eyes (keeping in mind that the temple arms of some frames are higher than eye level).

While it is relatively easy to increase declination angle with "flip-up" loupes because the oculars do not need the eyeglass lenses for support, the positioning of existing TTL oculars is limited by the bottom edge of each lens 122. As such, a significant problem with TTL loupes is the relatively small declination angle due to the limitation of size of the carrier lens. This causes the user to bend their head downwardly from the horizontal 102 at a head angle of 112 (or greater), which may result in neck strain. Thus, any technique to increase the declination angle in TTL loupes would result in a more ergonomic design.

SUMMARY OF THE INVENTION

This invention improves upon the existing art by providing loupes having an improved declination angle. The invention involves eyeglass frames with carrier lenses having bottom edges. A hole is provided in each carrier lens, each hole having an outer periphery that extends below the bottom edge of the carrier lens, resulting in a pair of opposing pointed ends. A pair of ocular devices are cemented in a respective one of the holes, such that a portion of the ocular body also extends below the bottom edge of the carrier lens. Each ocular is then cemented or otherwise permanently affixed into position to achieve a desired declination angle. For added stability, a pair of holes may be formed into the body of each ocular, each pair of holes being physically aligned with the two opposing pointed ends of the carrier lens associated with that ocular, such that the cement also enters into each hole, thereby stabilizing the pointed ends. The ocular bodies may be frusto-conical, in which case the hole formed in each carrier lens may be circular, semi-circular or oval shaped.

DETAILED DESCRIPTION OF THE INVENTION

In order to overcome the limitations of the prior art in terms of limited declination angle, this invention is directed to a new mounting method that significantly increases the declination angle and promotes a more healthy posture. In broad and general terms, instead of forming a complete bore through each eyeglass lens surrounded by lens material, the lower portion of each bore intersects with the bottom edge of each lens, such that a portion of the barrel of each ocular actually extends below the bottom edge of each lens, thereby increasing the declination angle.

Figure 1:
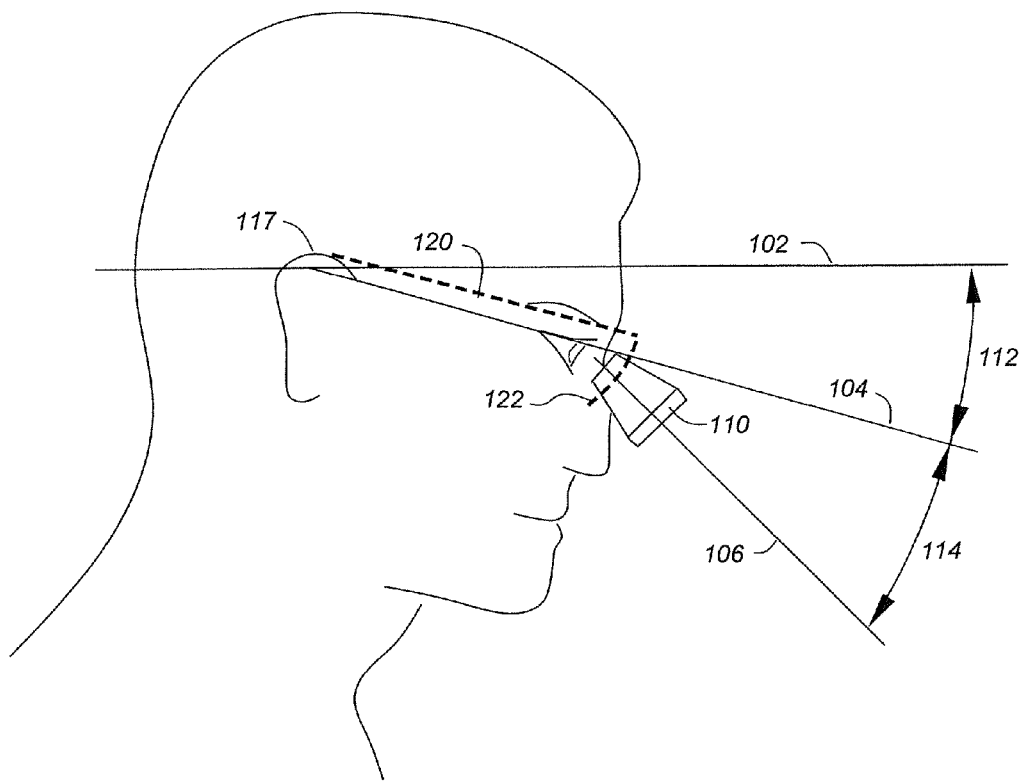
FIG. 1 is a drawing that shows geometries associated with eye-worn oculars.
Figure 2:
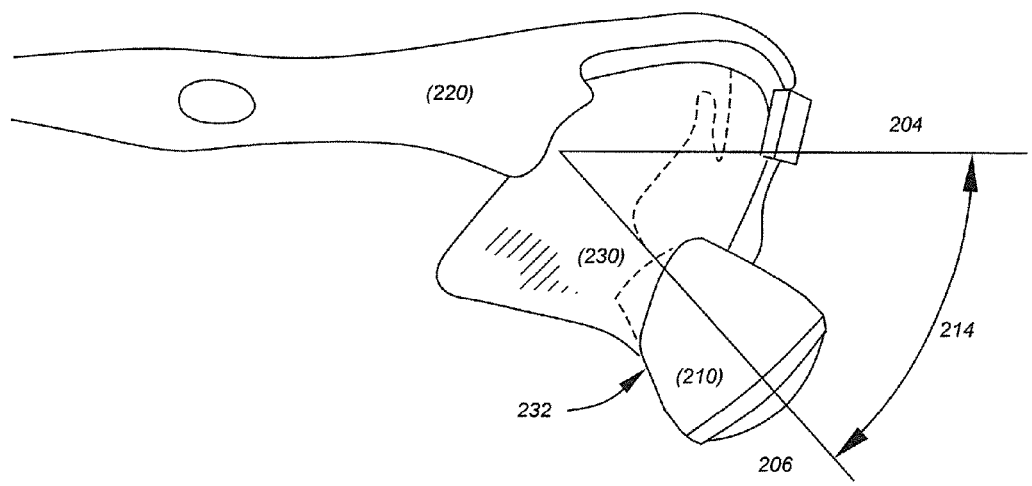
FIG. 2 illustrates the preferred embodiment of the invention, wherein the declination angle is improved.

FIG. 2 is a side view that illustrates a typical configuration. Eyeglass frames 220 include lenses 230 through which ocular(s) 210 are mounted. The declination angle 214 is shown between reference line 204 and the optical axis 206 of the ocular 210. Again, the temple arm of the frame 220 may be used as the reference line if the temple arms are mounted at the same level with eyes. Although the frames depicted are of a specific "designer" variety, virtually any style is applicable. Although the invention is preferably used with lenses that have no bottom rim, the system and method may actually be used with lenses that have bottom rims so long as they can be modified as described herein.

Broadly according to the invention, a bore is formed through each lens in such a way that the outline of each bore intersects with the bottom edge of each lens, thereby forming an open semi-circle in the bottom of each carrier lens with two points 330, 332. With this configuration, loupes may be positioned further downwardly on each lens, thereby increasing the declination angle, DA. If the outer surface of the ocular body is frusto-conical, the bore through each lens is generally circular or slightly oval. The invention may be deployed by modifying existing lenses, particularly if plastic, or by providing lenses with the desired shape in the first place.

Figure 3:
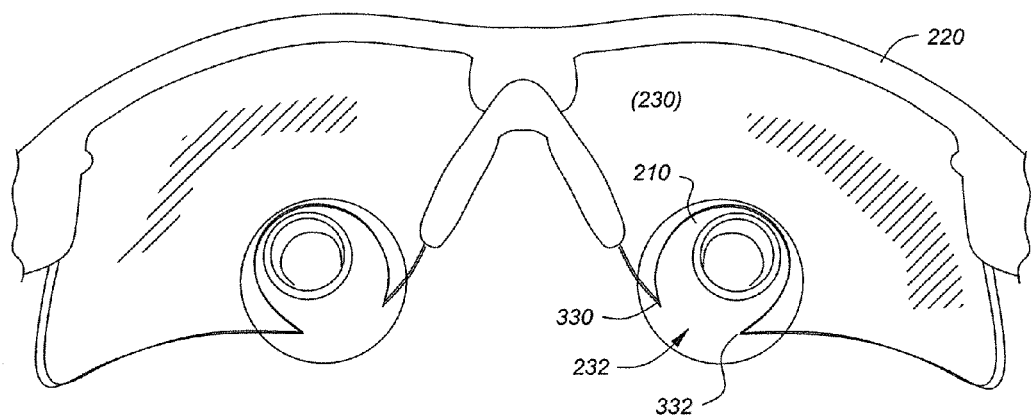
FIG. 3 is a view from a user's viewpoint showing attachment points.

FIG. 3 shows the structure from a wearer's perspective. The eyeglass frames are shown at 220. A hole is drilled in each carrier lens 230 such that a portion of the periphery of the hole 232 extends beyond the bottom edge of the lens creating a pair of opposing pointed ends 330, 332 (FIG. 2). The ocular 210 is then aligned on a fixture for a desired DA and cemented into position.

Figure 4:
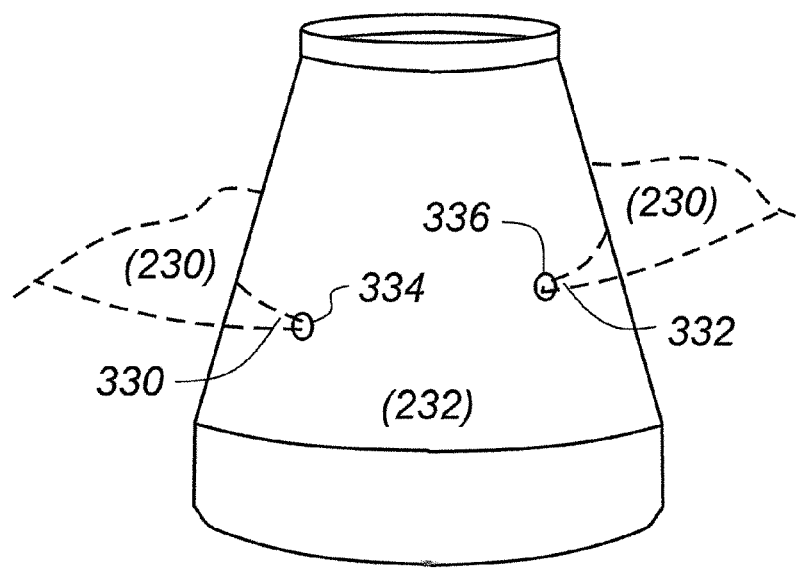
FIG. 4 is drawing that depicts how holes may be drilled into the ocular bodies to enhance assembled stability.

While the oculars may simply be cemented in each semi-circular cut-out without further modification, in the preferred embodiment, small holes are drilled in the outer surfaces of the oculars to assist with correct positioning and stability. As shown in FIG. 4, these holes 334, 336 are drilled into the body of each ocular 232 so as to align with the pointed ends 330, 332 of the carrier lens 230. When the cement is applied, a portion of the cement flows into the holes, maintain the structural integrity of the assembly.

The invention claimed is:

1. Loupes with an improved declination angle, comprising:
- eyeglass frames with carrier lenses, each carrier lens having a lower edge;
- a hole formed in each carrier lens, each hole defining an outer edge that intersects with the lower edge of its respective carrier lenses, such that each carrier lens has a gap devoid of lens material between opposing spaced apart points of lens material oriented toward one another;
- a pair of loupes, each having a body cemented in a respective one of the holes, such that a portion of each loupe also extends below the bottom edge of its respective carrier lens; and wherein each loupe is cemented in position to achieve a desired declination angle.

2. The loupes of claim 1, further including a pair of holes formed into the body of each loupe, each pair of holes being physically aligned with the two opposing pointed ends of the carrier lens associated with that loupe, such that the cement also enters into each pair of holes to provide additional structural stability.

3. The loupes of claim 1, wherein:
- the loupes are frusto-conical; and
- the hole formed in each carrier lens is circular, semi-circular or oval shaped.

* * * * *

UNITED STATES PATENT AND TRADEMARK OFFICE
CERTIFICATE OF CORRECTION

PATENT NO. : 9,465,235 B2  
APPLICATION NO. : 14/554551  
DATED : October 11, 2016  
INVENTOR(S) : Byung J. Chang Page 1 of 1

It is certified that error appears in the above-identified patent and that said Letters Patent is hereby corrected as shown below:

In the Claims

Column 3, Line 2, change "Loupes" to --Optical apparatus--.
Column 3, Line 17, change "loupes" to --apparatus--.
Column 3, Line 23, change "loupes" to --apparatus--.

Signed and Sealed this
Fourteenth Day of May, 2019

Andrei Iancu
*Director of the United States Patent and Trademark Office*

/

(12) EX PARTE REEXAMINATION CERTIFICATE (12062nd)
United States Patent
Chang

(10) Number: US 9,465,235 C1
(45) Certificate Issued: May 26, 2022

(54) THROUGH-THE-LENS (TTL) LOUPES WITH IMPROVED DECLINATION ANGLE

(71) Applicant: General Scientific Corporation, Ann Arbor, MI (US)

(72) Inventor: Byung J. Chang, Ann Arbor, MI (US)

(73) Assignee: GENERAL SCIENTIFIC CORPORATION, Ann Arbor, MI (US)

Reexamination Request:
No. 90/014,787, Jun. 28, 2021

Reexamination Certificate for:
Patent No.: 9,465,235
Issued: Oct. 11, 2016
Appl. No.: 14/554,551
Filed: Nov. 26, 2014

Certificate of Correction issued May 14, 2019

Related U.S. Application Data

(63) Continuation of application No. 29/480,902, filed on Jan. 30, 2014, now Pat. No. Des. 746,354.

(60) Provisional application No. 61/909,405, filed on Nov. 27, 2013.

(51) Int. Cl.
*G02C 7/08* (2006.01)
*G02B 25/00* (2006.01)

(52) U.S. Cl.
CPC ............. *G02C 7/088* (2013.01); *G02B 25/00* (2013.01)

(58) Field of Classification Search
CPC ................................ G02C 7/086; G02C 7/088
See application file for complete search history.

(56) References Cited

To view the complete listing of prior art documents cited during the proceeding for Reexamination Control Number 90/014,787, please refer to the USPTO's public Patent Application Information Retrieval (PAIR) system under the Display References tab.

*Primary Examiner* — Sara S Clarke

(57) ABSTRACT

Dental/medical/surgical loupes have an improved declination angle to reduce neck and back strain. Eyeglass frames are provided with carrier lenses having bottom edges. A hole is provided in each carrier lens, each hole having an outer periphery that extends below the bottom edge of the carrier lens, resulting in a pair of opposing pointed ends. A pair of ocular devices are cemented in a respective one of the holes, such that a portion of the ocular body also extends below the bottom edge of the carrier lens. Each ocular is then cemented or otherwise permanently affixed into position to achieve a desired declination angle. For added stability, a pair of holes may be formed into the body of each ocular, each pair of holes being physically aligned with the two opposing pointed ends of the carrier lens associated with that ocular.

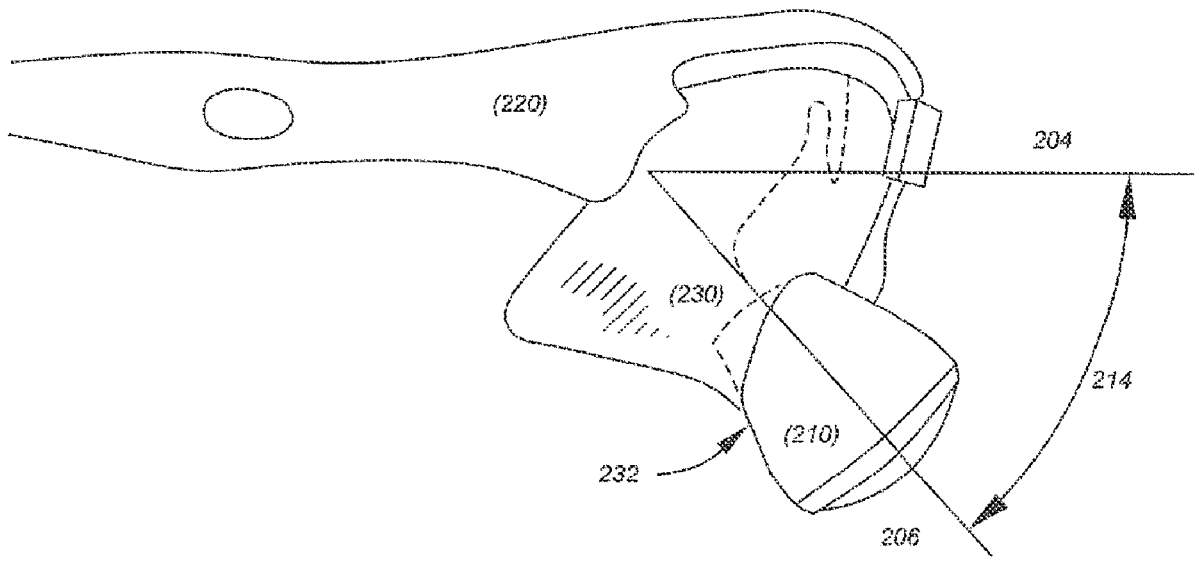

EX PARTE REEXAMINATION CERTIFICATE

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1-3 is confirmed.

New claims 4-11 are added and determined to be patentable.

*4. The apparatus of claim 1, wherein the carrier lenses have no bottom rim.*

*5. The apparatus of claim 1, wherein each carrier lens is defined by lens material disposed in front of a respective right and left eye of a wearer.*

*6. The apparatus of claim 5, wherein the lens material is semi-rimless with no frame on the bottom of the lens material.*

*7. The apparatus of claim 1, wherein:*
*each loupe has a barrel portion; and*
*the barrel portion of each loupe extends below the edge of each lens.*

*8. The apparatus of claim 1, wherein the carrier lenses are made with a plastic material.*

*9. The apparatus of claim 1, wherein the carrier lenses are made with a curved plastic material.*

*10. Optical apparatus with an improved declination angle, comprising:*
*eyeglass frames with right and left carrier lenses;*
*wherein the right and left carrier lenses are formed from a plastic material having an exposed bottom edge without a rim;*
*a hole formed in each carrier lens, each hole defining an oval or circular shape that intersects with the exposed edge of a respective carrier lenses, resulting in a gap in the lens material between opposing spaced apart points of lens material;*
*a pair of loupes, each loupe having a body between front and rear ends; and*
*wherein the body of each loupe is cemented in a respective one of the holes, such that a portion of each body extends beyond the exposed edge of the lens material to achieve a desired declination angle.*

*11. The apparatus of claim 10, wherein the lens material is curved.*

\* \* \* \* \*